July 28, 1959     R. LESTER ET AL     2,897,143
HYDROCATALYTIC DESULPHURISATION OF PETROLEUM HYDROCARBONS
Filed Jan. 16, 1956
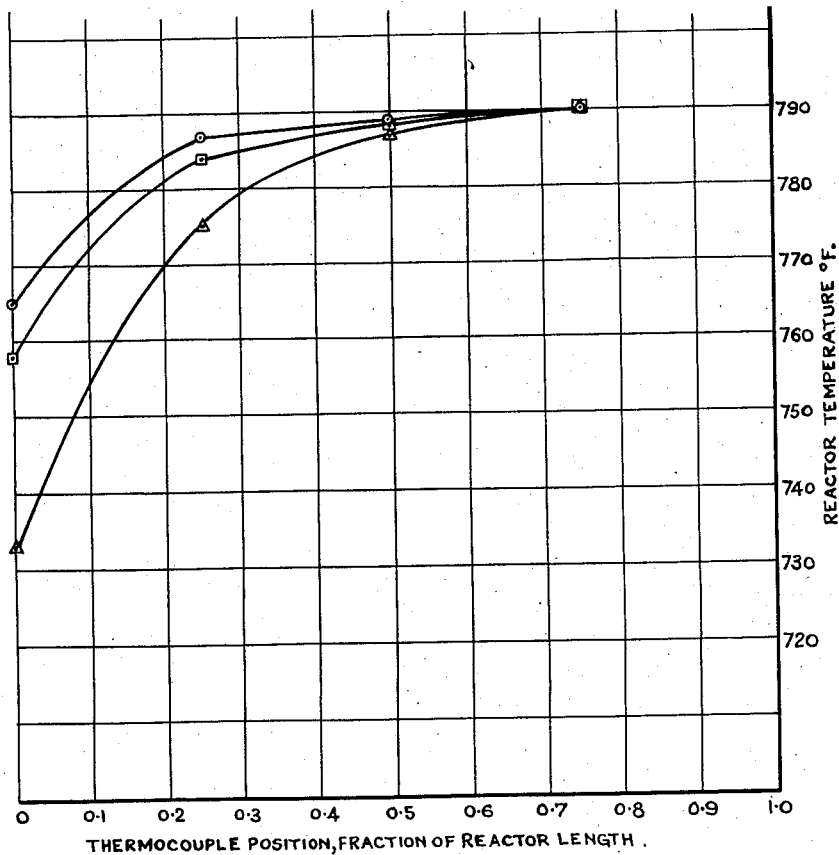
INVENTORS:
RONALD LESTER
HUBERT THOMAS PORTER
BY: Morgan, Finnegan, Durham & Pine
ATTORNEYS

United States Patent Office 2,897,143
Patented July 28, 1959

2,897,143

HYDROCATALYTIC DESULPHURISATION OF PETROLEUM HYDROCARBONS

Ronald Lester, Sunbury-on-Thames, and Hubert Thomas Porter, London, England, assignors to The British Petroleum Company Limited, London, England, a corporation of Great Britain Application January 16, 1956, Serial No. 559,354

Claims priority, application Great Britain January 18, 1955

7 Claims. (Cl. 208—213)

This invention relates to the hydrocatalytic desulfurization of petroleum hydrocarbons wherein the hydrocarbons are contacted with a sulfur-resistant hydrogenation catalyst at elevated temperature and pressure, and more particularly to processes of this kind in which the petroleum hydrocarbons are treated substantially in the liquid phase so that the amount of hydrogen recycled is very much less than is required when operating with the feedstock substantially in the vapor phase. Such a liquid phase process is particularly applicable to the heavier petroleum feedstocks such as gas oil.

The hydrocatalytic desulfurization reaction is exothermic and in commercial units operating the liquid phase processes referred to above, the heat of reaction is taken up by means of cold feedstock injected at various heights in a downflow reactor to maintain an average constant temperature throughout the catalyst beds. A reactor of such a design adds considerably to the cost of the plant since it must be equipped with pumps for injecting cold feed, devices for mixing and redistributing the blend of product and feed, and must consist of a large high pressure vessel to maintain the required space velocity.

The principal object of the present invention is to provide a method of operating a liquid phase hydrocatalytic desulfurization process of the kind referred to, which will enable the design of the reactor to be considerably simplified, and which in particular will dispense with the need for cooling in the reactor.

According to the present invention, in a liquid phase hydrocatalytic desulfurization process of the kind referred to, the feedstock is admitted to the reactor at a temperature sufficiently below the desired reaction temperature that the heat of reaction raises the reactor temperature to the desired reaction temperature.

The results of treating various feedstocks by the adiabatic process in accordance with the present invention are set out in the following Table No. 1, in comparison with those obtained using a reactor having a uniform temperature therein, as at present used commercially.

Table 1

| Feedstock | Isothermal operation | | | Adiabatic operation | | |
|---|---|---|---|---|---|---|
| | S.R. gas oil | 80% S.R. gas oil/ 20% light cycle oil | Light cycle oil | S.R. gas oil | 80% S.R. gas oil/ 20% light cycle oil | Light cycle oil |
| Total sulfur, percent weight | 1.28 | 1.54 | 2.54 | 1.28 | 1.54 | 2.54 |
| Operating conditions: | | | | | | |
| Catalyst | Co-Mo oxides on $Al_2O_3$ | | | Co-Mo oxides on $Al_2O_3$. | | |
| Pressure, p.s.i.g. | 1,000 | | | 1,000. | | |
| Space velocity, v./v./hr. | 8.0 | | | 8.0. | | |
| Gas recycle rate, s.c.f./b. | 1,250 | | | 1,250. | | |
| Make up gas | Platformer exit gas (70–80% mol. $H_2$). | | | Platformer exit gas (70–80% mol. $H_2$). | | |
| Preheated feed temp. at reactor inlet, ° F. | 780 | 780 | 780 | 765 | 758 | 733 |
| Catalyst bed temperatures: | | | | | | |
| Top zone, ° F. | 780 | 780 | 780 | 787 | 784 | 775 |
| Middle zone, ° F. | 780 | 780 | 780 | 789 | 788 | 787 |
| Bottom zone, ° F. | 780 | 780 | 780 | 790 | 790 | 790 |
| Liquid product: | | | | | | |
| Total sulfur, percent weight | 0.1 | 0.1 | 0.1 | 0.1 | 0.1 | 0.1 |

It will be seen that it is possible by the process of the invention to obtain products having a sufficiently low sulfur content without reducing the rate at which the feedstock is passed through the reactor.

It will also be seen that the heat of reaction occurs mainly in the top zone of the catalyst bed, and that the remainder of the bed is at a substantially uniform temperature. This effect may be seen more clearly in the accompanying diagram which records the temperature at different positions in the catalyst bed as determined by thermocouples. The thermocouple positions are designated as fractions of the reactor length measured from the top of the reactor.

The processes illustrated in Table 1 were carried out at relatively high temperature and pressure. It may sometimes be desirable to operate at much lower temperatures and pressures. For example, the cost of the plant would be considerably reduced by operating at pressures in the region of 500 lb./sq. in. instead of 1000 lb./sq. in. However, in such case, a lower space velocity of the feedstock would be necessary so that a larger volume of catalyst would be required. This in time would involve greater difficulty in distributing the cold feed when employing this method of controlling the temperature in the reactor. The results set out in the following Table No. 2, show that the method according to the invention is applicable when operating at much lower temperature and pressure.

Table 2

| Feedstock | SR gas oil | 80% SR gas oil/ 20% light cycle oil blend. |
|---|---|---|
| Sulfur content, percent weight | 1.28 | 1.56. |
| Operating conditions: | | |
| Catalyst | Cobalt molybdate on alumina. | |
| Pressure, p.s.i.g | 475. | |
| Space velocity, v./v./hr | 1.25. | |
| Gas recycle rate, s.c.f./b | 1,100. | |
| Make up gas | $H_2S$ removal from recycle gas. Platformer exit gas containing 70% mol hydrogen. | |

| Reactor | Isothermal | Adiabatic with a temperature gradient | Isothermal | Adiabatic with a temperature gradient |
|---|---|---|---|---|
| Inlet temperature, °F | 700 | 681 | 700 | 673 |
| Outlet temperature, °F | 700 | 700 | 700 | 700 |
| Liquid product: sulfur content, percent weight | <0.1 | <0.1 | <0.1 | <0.1 |

We claim:

1. A process for the hydrocatalytic desulfurization of petroleum hydrocarbons comprising contacting the feedstock in the liquid phase with a sulfur-resistant hydrogenation catalyst in a reaction zone at a reaction temperature selected to achieve the required desulfurization and at a pressure such that the feed-stock is maintained in the liquid phase, and setting the inlet temperature of the incoming feedstock below the selected reaction temperature necessary for the required desulfurization and at a level at which the heat of reaction will raise the temperature of the incoming feedstock to the selected reaction temperature over a comparatively short inlet portion of the catalyst bed.

2. A process according to claim 1, wherein the feedstock is a straight-run gas oil.

3. A process according to claim 1, wherein the feedstock is a blend of straight-run and cracked gas oils.

4. A process according to claim 1, wherein the catalyst comprises the oxides of cobalt and molybdenum incorporated with a supoprt consisting essentially of alumina.

5. A process according to claim 1, wherein the feedstock is selected from the group consisting of straight-run gas oil, light cycle oil, and blends of a major amount of a straight-run gas oil with a minor amount of light cycle oil.

6. A process according to claim 1, wherein the feedstock is a blend of 80% straight-run as oil and 20% light cycle oil.

7. A process according to claim 1, wherein the feedstock is a light cycle oil.

References Cited in the file of this patent

UNITED STATES PATENTS 2,376,086   Reid _____ May 15, 1945

UNITED STATES PATENT OFFICE

CERTIFICATE OF CORRECTION

Patent No. 2,897,143                          July 28, 1959

Ronald Lester et al.

It is hereby certified that error appears in the printed specification of the above numbered patent requiring correction and that the said Letters Patent should read as corrected below.

Column 4, line 17, for "supoprt" read -- support --; line 24, for "as" read -- gas --.

Signed and sealed this 23rd day of August 1960.

(SEAL)
Attest:

KARL H. AXLINE
Attesting Officer

ROBERT C. WATSON
Commissioner of Patents